US008532088B1

(12) United States Patent
Croak et al.

(10) Patent No.: US 8,532,088 B1

(45) Date of Patent: Sep. 10, 2013

(54) METHOD AND APPARATUS FOR PROVIDING CALL CENTER AGENTS WITH CALLING PARTY INFORMATION

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1822 days.

(21) Appl. No.: 11/294,085

(22) Filed: Dec. 5, 2005

(51) Int. Cl.

| | |
|---|---|
| ***H04L 12/66*** | (2006.01) |
| ***H04M 3/42*** | (2006.01) |
| ***H04M 3/00*** | (2006.01) |
| ***H04M 5/00*** | (2006.01) |

(52) U.S. Cl.
USPC ................. 370/352; 379/265.01; 379/265.13; 379/207.15

(58) Field of Classification Search
USPC 370/352; 379/265.01–266.1, 207.14–207.15
See application file for complete search history.

(56) References Cited

U.S. PATENT DOCUMENTS

| | | | | |
|---|---|---|---|---|
| 6,314,089 | B1 * | 11/2001 | Szlam et al. | 370/270 |
| 6,628,770 | B1 * | 9/2003 | Jain et al. | 379/207.14 |
| 6,977,933 | B2 * | 12/2005 | Soncodi et al. | 370/392 |
| 2005/0078811 | A1 * | 4/2005 | Moss et al. | 379/207.02 |
| 2005/0123123 | A1 * | 6/2005 | Creamer et al. | 379/265.02 |
| 2006/0062376 | A1 * | 3/2006 | Pickford | 379/265.12 |

* cited by examiner

*Primary Examiner* — Asad Nawaz
*Assistant Examiner* — Nicholas Jensen

(57) ABSTRACT

A method and apparatus for providing call center agents with calling party information for calls initiated behind trunks on packet networks such as Voice over Internet Protocol (VoIP) and Service over Internet Protocol (SoIP) networks are disclosed. The method enables a network service provider such as a telephone company to provide toll free service to an enterprise customer, and to provide the enterprise customer with the trunk group identifiers that customers of the enterprise utilize to access services provided by the enterprise.

10 Claims, 5 Drawing Sheets

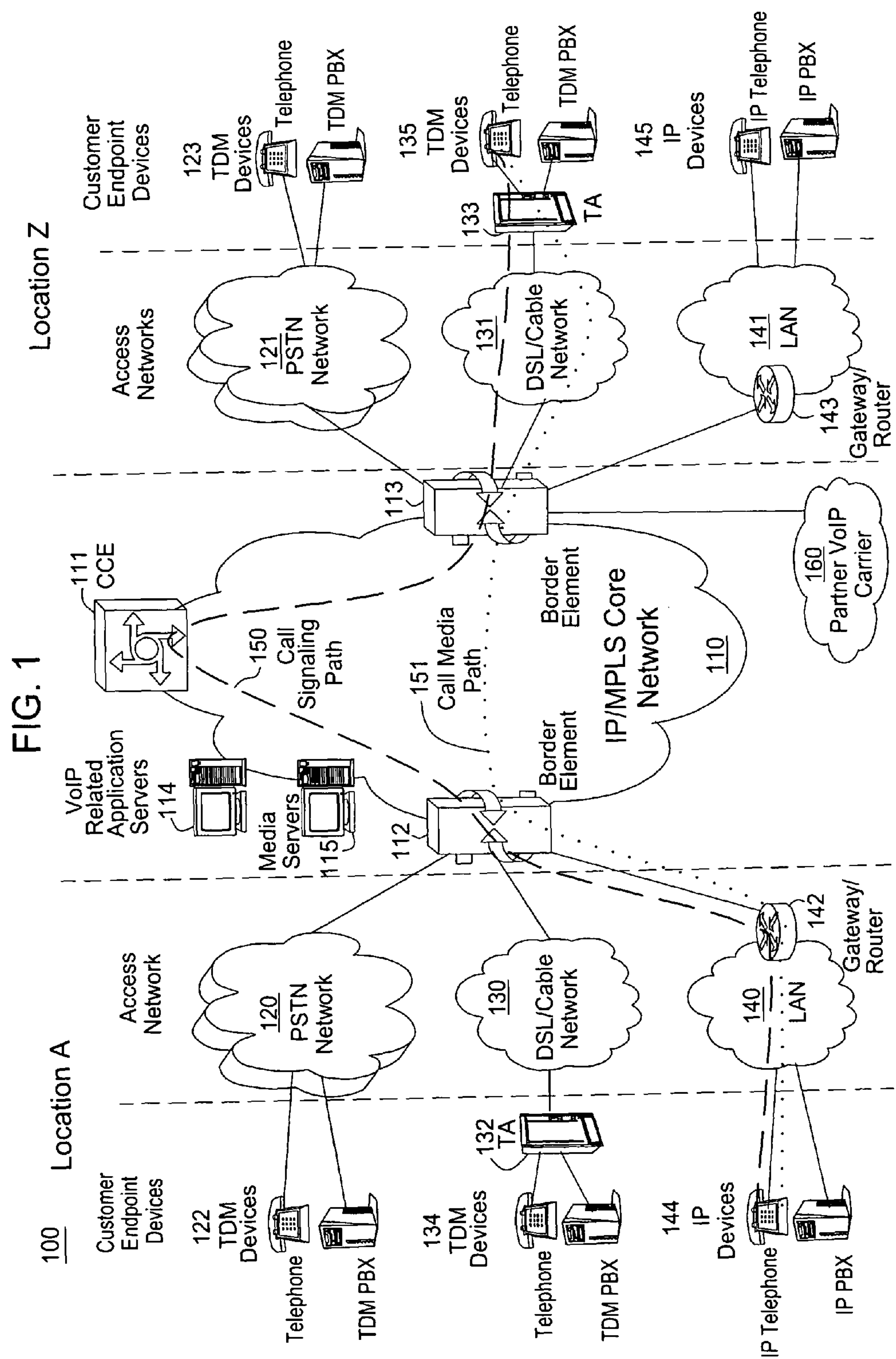
FIG. 1
100
Location A
Location Z
Customer Endpoint Devices
Access Network
Access Networks
122 TDM Devices
Telephone
TDM PBX
134 TDM Devices
132 TA
144 IP Devices
IP Telephone
IP PBX
120 PSTN Network
130 DSL/Cable Network
140 LAN
142 Gateway/ Router
112
Border Element
VoIP Related Application Servers 114
Media Servers 115
111 CCE
150 Call Signaling Path
151 Call Media Path
IP/MPLS Core Network
110
113
Border Element
160 Partner VoIP Carrier
121 PSTN Network
131 DSL/Cable Network
141 LAN
143 Gateway/ Router
133 TA
123 TDM Devices
135 TDM Devices
145 IP Devices

METHOD AND APPARATUS FOR PROVIDING CALL CENTER AGENTS WITH CALLING PARTY INFORMATION

The present invention relates generally to communication networks and, more particularly, to a method for providing call center agents with calling party information for calls that are initiated behind trunks on packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are relying on their Internet connections for all voice and data communications. For example, enterprise customers may setup toll-free numbers, e.g. 1-800 numbers, for their customers to use without incurring telephone charges. Customers of the enterprise customers upon calling the toll free number often expect exceptional service to be provided, especially if the enterprise is able to identify the caller as a preferred customer. To illustrate, when a customer originates a telephone call from a phone number that can be displayed and identified, the enterprise may retrieve information about the customer such that it is readily available when a call center agent answers the phone. However, when a customer originates the call behind trunks, e.g., from a non-residential environment, the calling party identifier only shows the trunk group identifier. Thus, the call center agent does not have the necessary information about the customer readily available prior to answering the phone. Thus, the customer's expectation of exceptional service is not satisfied and the enterprise's call center agents are burdened with acquiring these necessary information directly from the customers, thereby increasing the overall cost to the enterprise. Namely, the call center agents must spend an amount of time to gather basic information about the calling customers.

Therefore, there is a need for a method that provides call center agents with calling party information for calls originated (or based) behind trunks.

SUMMARY OF THE INVENTION

In one embodiment, the present invention discloses a method and apparatus for providing call center agents with calling party information for calls based behind trunks on packet networks such as Voice over Internet Protocol (VoIP) and Service over Internet Protocol (SoIP) networks. The method enables a network service provider to provide a toll free service to an enterprise customer, and to provide the enterprise customer with the trunk group identifiers that customers of the enterprise customer may utilize to access services provided by the enterprise customer, e.g., calling a call center of the enterprise customer. When the enterprise call center receives a call from a registered trunk group identifier, an interactive session is invoked with a media server to gather customer information, e.g., invoking an Interactive Voice Response (IVR) session to receive account information. The gathered information is then used to enable the call center agent to have the caller's information readily available when he or she answers the call.

BRIEF DESCRIPTION OF THE DRAWINGS

The teaching of the present invention can be readily understood by considering the following detailed description in conjunction with the accompanying drawings, in which:

FIG. 1 illustrates an exemplary network related to the present invention;

To facilitate understanding, identical reference numerals have been used, where possible, to designate identical elements that are common to the figures.

DETAILED DESCRIPTION

Figure 2:
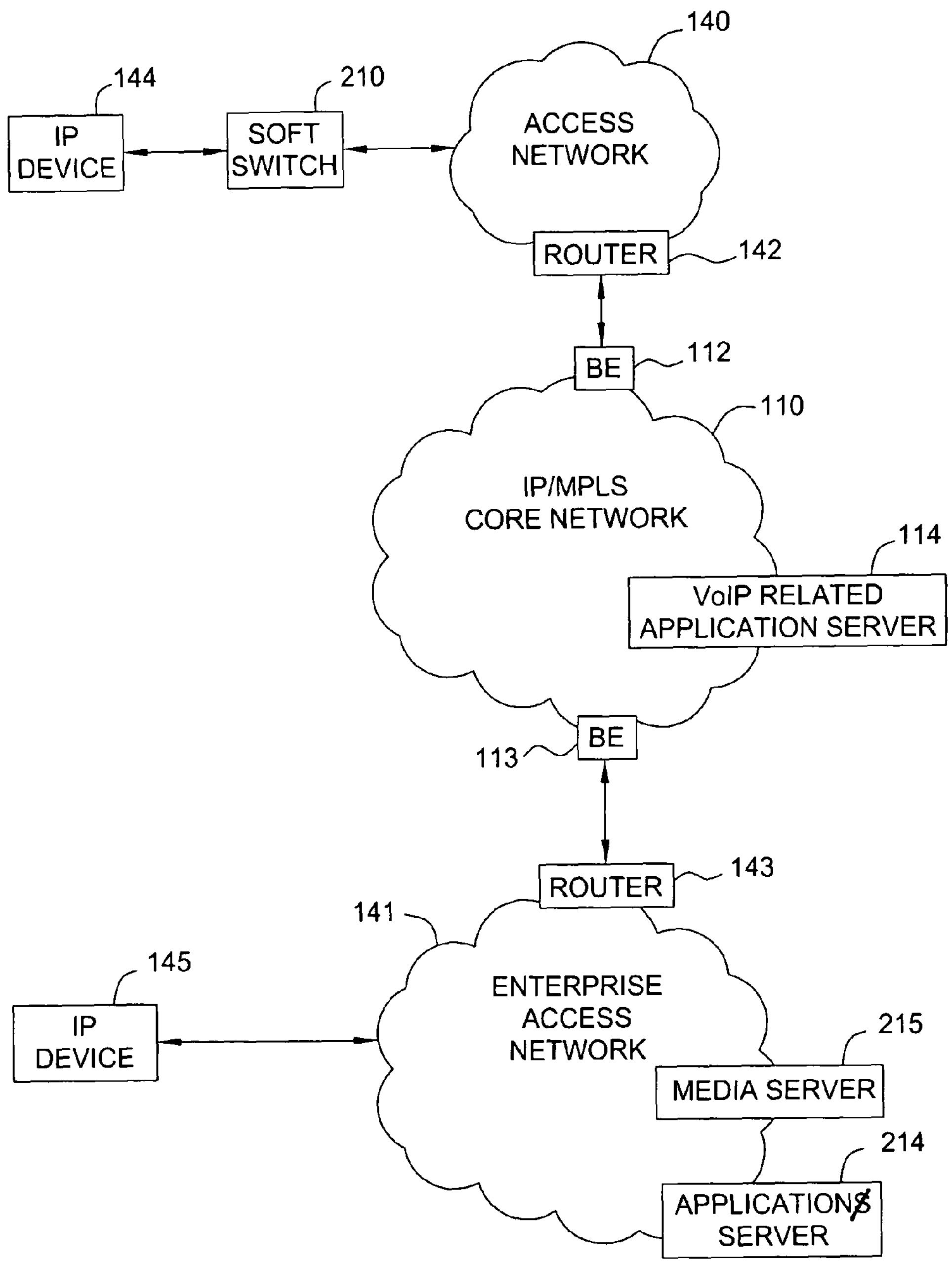
FIG. 2 illustrates an exemplary network with one embodiment of the invention for providing call center agents with calling party information for calls based behind trunks.

The present invention broadly discloses a method and apparatus for providing call center agents with calling party information for calls based behind trunks on packet networks such as Voice over Internet Protocol (VoIP) and Service over Internet Protocol (SoIP) networks. Although the present invention is discussed below in the context of providing information on VoIP and SoIP networks, the present invention is not so limited. Namely, the present invention can be applied for other networks such as wireless networks and the like.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported on packet networks such as VoIP and SoIP networks. Enterprises may setup toll-free numbers, e.g. 1-800 numbers, for their customers to use without incurring telephone charges. The customer calls the provided toll-free number with expectation of exceptional service. For example, the customer expects that the call center agent answering the call would have all the pertinent information such as account number, order information, purchase information and the like. Such information could be readily associated with a customer's phone number. For example, if the customer's phone number is displayed during a call, then the enterprise may retrieve the customer information using the displayed phone number, such that the customer information is readily available when a call center agent answers the call. However, if the customer originates the call behind trunks, e.g., from a non-residential environment, the calling party identifier shows the trunk group identifier instead. For example, if the customer works for a large corporation and calls from a work environment, then the trunk group identifier will reflect a phone number associated with the large corporation. Using the trunk identifier, the call center agent cannot readily retrieve pertinent information about the customer prior to answering the phone call.

In one embodiment, to address this criticality, the current invention discloses a method and apparatus for providing call center agents with calling party information for calls based behind trunks. In order to clearly illustrate the teachings of the current invention, the following terminologies and networking concepts will first be described:

Calling party;
Called party;
Call center;
Call center agent;
Trunk;
Trunk group;
Trunk group identifier;
Caller Identification (CID); and
Interactive Voice Response (IVR).

A calling party refers to a person or device that originates a call, whereas the called party refers to the person or device that receives the call. For example, if a person calls 911 for obtaining emergency service, the calling party is the person dialing 911 and the called party is the person or device receiving the 911 call.

A call center refers to a part of an organization or enterprise where calls to and/or from customers are handled. Call centers typically have the ability to handle a large number of calls simultaneously and include some degree of automation for distributing calls to the various agents who converse with the calling parties. Call center agent refers to an agent located at a call center who is receiving calls from customers, or placing calls to customers. For example, enterprises may have a call center for product support, sales, etc.

Trunk refers to a transmission channel between two switching centers. A trunk group refers to two or more telephone lines or trunks of the same type between two given point. For example, an enterprise receiving a T1 service from a traditional telephone service provider has 1.544 Mbps of capacity available for use. The T1 line has 24 channels each at 64 kbps. The enterprise may group the first 8 channels for incoming calls, the $9^{th}$ through $16^{th}$ channels for outgoing calls, and the $17^{th}$ through $24^{th}$ channels for customers calling with toll free numbers. In this example, the T1 then has three trunk groups. Each trunk group has the same type of telephone lines, e.g., for inbound calls, outbound calls, etc., and is assigned a trunk group identifier. When calls are initiated from behind a trunk group, the channels for outbound calls are assigned. The channels within a trunk group are designed to be indistinguishable. When the service is provided on the VoIP or SoIP platform, trunk groups are created and managed using a softswitch.

Caller Identification (CID) refers to a network service that sends the calling party's telephone number to the called party such that the called party's telephone equipment could display the calling party's telephone number during the ringing.

If the called party subscribes to a CID service, the called party is then able to identify the calling party's phone number during the ringing.

If an enterprise has a call center staffed with call center agents and subscribes to a CID service, then the call center is able to see the calling party's phone number during the ringing for calls originated from residential telephone numbers that have no special features to block the caller identification feature. However, if the calling party is using a telephone line behind trunks, the trunk group identifier is displayed instead of the calling party's phone number.

Interactive Voice Response (IVR) refers to a telecommunications application where users interact with a database without requiring human interaction over the telephone.

In one embodiment, the current invention enables the call center to register trunk group identifiers associated with customers such that an IVR application can prompt the callers from these numbers to enter their information such as account number, entity name, etc. The present method enables a network service provider such as a telephone company to provide toll free service to an enterprise customer, and to provide the enterprise customer with the trunk group identifiers that customers of the enterprise utilize to access services provided by the enterprise. When the enterprise's call center receives a call associated with a registered trunk group identifier, the enterprise invokes an interactive session with a media server to gather customer information, e.g., an Interactive Voice Response (IVR) session to receive customer related information. The gathered information is then used to enable the call center agent to have the caller's information readily available when he or she answers the call.

FIG. 2 illustrates an exemplary network 200 with one embodiment of the present invention for providing call center agents with calling party information for calls based behind trunks. To illustrate, packets are exchanged between a customer of an enterprise using IP device 144 and an enterprise call center agent using IP device 145. The IP device 144 is attached to a softswitch 210 used for creating trunk groups and trunk group identifiers. The softswitch 210 is attached to an access network 140. The access network 140 contains a gateway router 142. The packets transmitted by IP device 144 traverse the softswitch 210 and the access network 140 towards the router 142. The router 142 is connected to the IP/MPLS core network 110 through the border element 112. Packets originated by the IP devices 144 then traverse the core network 110 from border element 112 to border element 113. Border element 113 is connected to the enterprise's access network 141 through the router 143. The enterprise call center agent utilizes the IP device 145 to access VoIP or SoIP services through the access network 141.

In one embodiment, the VoIP application server 114 located in the IP/MPLS core network 110 is utilized by the network service provider for providing toll free service to the enterprise customer, and for providing trunk group identifiers of the calling parties for calls being terminated by the enterprise customer. The enterprise customer utilizes an application server 214 for implementing the present invention for providing call center agents with calling party information (broadly defined as account information) for calls based behind trunks and for registering trunk group identifiers as received from the network service provider. The application server 214 utilizes a media server 215 for media related functions such as providing responses to customer request in a format compatible with the endpoint device used by the customer, handling and terminating media streams, and providing services such as announcements, Interactive Voice Response (IVR) messages, etc. Note that only the network elements used to describe the present invention are illustrated in FIG. 2. It is not intended to show all network elements used to deliver a VoIP or SoIP service.

Figure 3:
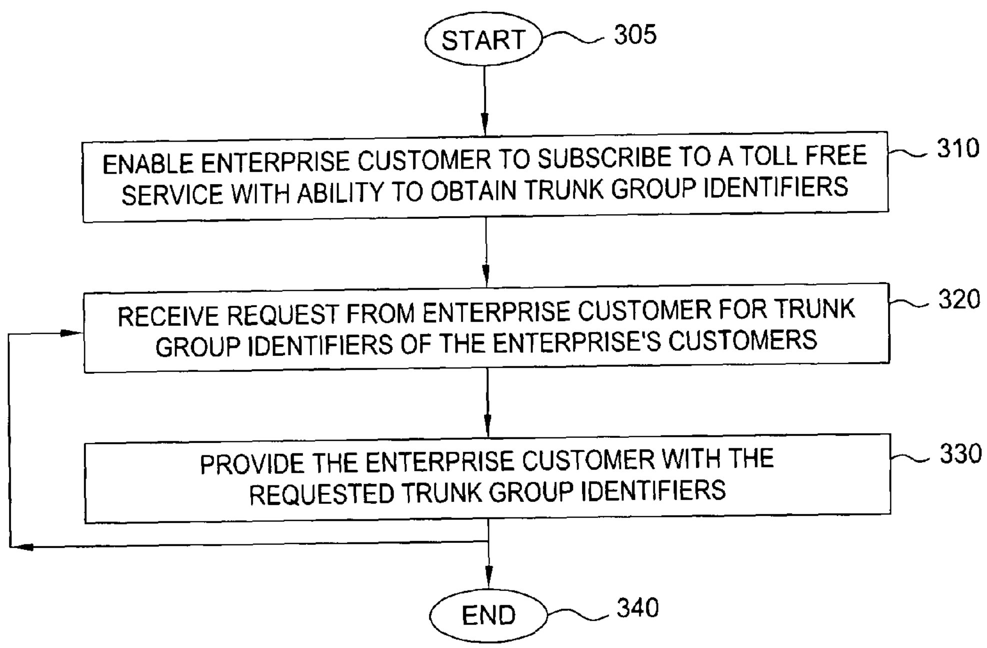
FIG. 3 illustrates a flowchart of a method for providing trunk group identifiers to an enterprise customer.

FIG. 3 illustrates a flowchart 300 of an exemplary method for providing trunk group identifiers to an enterprise customer. Specifically, the network service provider enables an enterprise customer to subscribe to a toll free service with trunk group identifiers of the calling parties. Method 300 starts in step 305 and proceeds to step 310.

In step 310, method 300 enables an enterprise customer to subscribe to a toll free service with the ability to obtain a trunk group identifier of the enterprise's customers. For example, a retailer subscribes to a toll free service from a service provider and requests the additional functionality of obtaining the trunk group identifiers of callers who call the toll free number.

In step 320, method 300 receives a request from an enterprise customer for trunk group identifiers of the enterprise's customers. For example, the enterprise may wish to determine the trunk group identifier of specific customers e.g., customers with the highest volume of business, customers who opened new accounts, etc.

In step 330, method 300 provides the enterprise customer with the requested trunk group identifiers. For example, customer "x" is using trunk group identifier "number y" when calling the toll free number associated with the enterprise. The method may returns to step 320 to continue receiving more requests from the enterprise customer as the enterprise customer acquires more customers or to step 340 to end processing the current request.

It should be noted that the method of FIG. 3 can be automated. For example, the requested trunk group identifiers can be automatically sent to the enterprise on a regular basis, e.g., every hour, every 12 hours, every day and so on. Thus, the enterprise customer does not have to make the request to the service provider on a regular basis.

Figure 4:
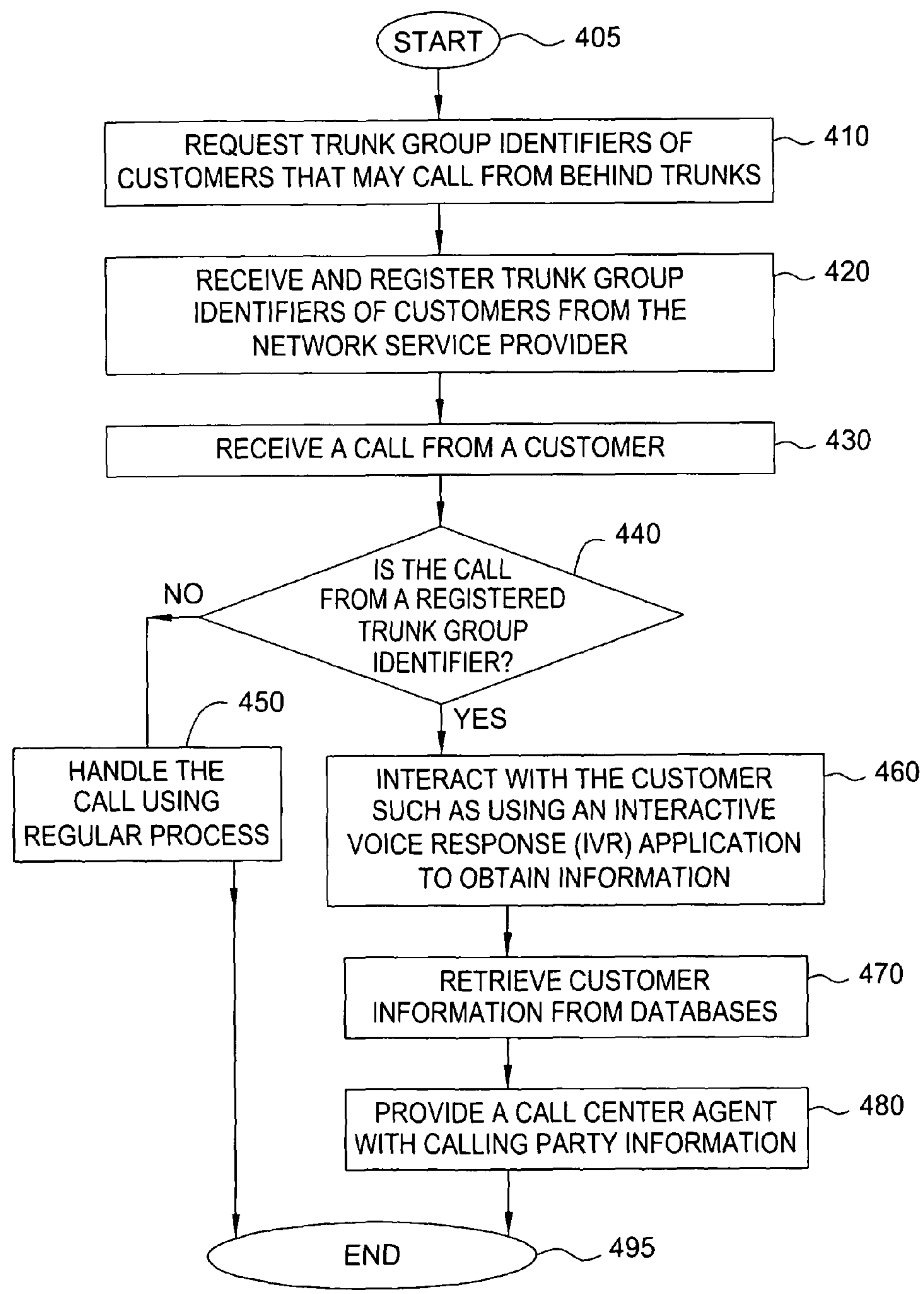
FIG. 4 illustrates a flowchart of a method for providing call center agents with calling party information for calls based behind trunks.

FIG. 4 illustrates a flowchart 400 of an exemplary method of the present invention for providing call center agents with calling party information for calls based behind trunks. Method 400 starts in step 405 and proceeds to step 410.

In step 410, method 400 requests trunk group identifiers of customers that may call from behind trunks from the network service provider of the toll free call service. For example, the enterprise sends a request for the trunk group identifiers associated with all callers to the toll free number during the last 24 hours, etc.

In step 420, method 400 receives and registers the trunk group identifiers of various customers. For the above example, the enterprise may register all the possible trunk group identifiers that various customers have used to initiate a call to the toll free number within the last 24 hours. The method then proceeds to step 430 to start receiving calls from the customers. Thus, it should be noted that steps 410 and 420 can be executed continuously in the background.

In step 430, method 400 receives a call from a customer. The call may or may not be initiated from behind a trunk. The method proceeds to step 440 to determine whether the call is from a trunk group identifier.

In step 440, method 400 determines whether or not the call is from a trunk group identifier. Namely, the enterprise maintains a list of trunk group identifiers that have been previously used by customers and have now been registered onto the list. If the call is not from a registered trunk group identifier, then the method proceeds to step 450 to handle the call using a regular process. Otherwise, the method proceeds to step 460 to invoke interaction with the customer.

In step 450, method 400 handles the call using the regular process. For example, if the subscriber called from a telephone such as a residential phone that can be identified by utilizing Caller Identification (CID), then the call center agent may utilize the CID to obtain the pertinent customer information prior to answering the call. The method then proceeds to step 495.

In step 460, method 400 invokes a method for interacting with the customer such as invoking an IVR application and gathers customer information. Since the enterprise may have several customers calling from registered or known trunk group identifiers, then the automated interaction with the customer is implemented by the enterprise to facilitate retrieval of customer data from databases. For example, the application server may utilize a media server with an IVR application to interact with the customer for requesting the customer to provide various customer information, e.g., a phone number associated with the customer account, an account number, an account name, etc., and then to authenticate the received information from the customer. This automated step accelerates the handling of the call by obtaining as much information as possible from the caller to assist the enterprise in preparing a call center agent for handling the call. The method then proceeds to step 470.

In step 470, method 400 retrieves account information from databases. For example, if the customer entered customer information such as account number "x" in step 460, account information that the call center agent needs is retrieved from one or more databases.

In step 480, method 400 provides the call center agent with calling party information, i.e., the account information. For the above example, when the call center agent answered the call, the account data retrieved in step 470 is presented to the call center agent. In one embodiment, the enterprise implements the present invention by displaying the account information on the call center agent's monitor. In another embodiment, the account information is displayed on the device used by the call center agent to answer the call such as the IP phone. The method then proceeds to step 495 to end processing of the current call.

In an alternate embodiment, step 440 and step 460 are implemented by the service provider. Namely, if the service provider detects a caller is initiating a call behind a trunk, i.e., the call has a trunk identifier, the service provider may interact with the caller on behalf of the enterprise customer before establishing the call through to the enterprise customer. For example, the service provider may utilize a media server maintained by the service provider to request the caller to provide a billing phone number. Upon receiving the billing phone number, the service provider establishes the call to the call center and also provides the billing phone number as provided by the caller. In this manner, the enterprise customer can simplify its operation, e.g., removing the need to maintain an application server or a media server.

Figure 5:
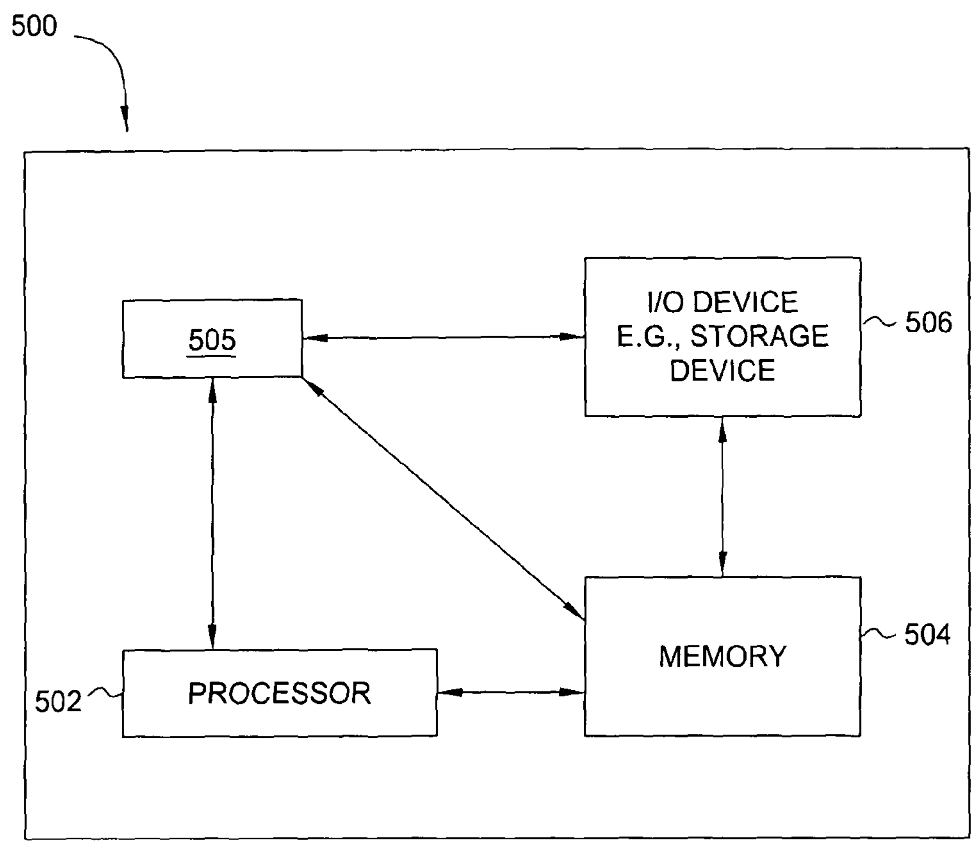
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing call center agents with calling party information for calls based behind trunks, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for providing call center agents with calling party information for calls based behind trunks can be loaded into memory 504 and executed by processor 502 to implement the functions as discussed above. As such, the present method 505 for providing call center agents with calling party information for calls based behind trunks (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing calling party information in a communication network, comprising:

receiving, by a processor, a call from a caller via a toll free number, wherein the toll free number is associated with a toll free service subscribed by an enterprise customer of a core communication network;

determining, by the processor, whether the call originates from behind a trunk, wherein the determining comprises determining whether a trunk group identifier is associated with the call, wherein the trunk group identifier is associated with a plurality of channels;

invoking, by the processor, an interactive voice response session with the caller if the call originates from behind the trunk, where the interactive voice response session is used for obtaining customer information from the caller; and using, by the processor, a caller identification for obtaining the customer information, if the call does not originate from behind the trunk, wherein the customer information is provided to a call center of the enterprise customer, wherein the customer information is for obtaining account information that is presented to a call center agent of the call center.

2. The method of claim 1, wherein the communication network is an internet protocol network.

3. The method of claim 1, wherein the interactive voice response session is implemented on a media server operated by the enterprise customer.

4. The method of claim 1, wherein the interactive voice response session is implemented on a media server operated by a service provider of a core communication network.

5. A non-transitory computer-readable medium storing a plurality of instructions which, when executed by a processor, cause the processor to perform operations for providing calling party information in a communication network, the operations comprising:

receiving a call from a caller via a toll free number, wherein the toll free number is associated with a toll free service subscribed by an enterprise customer of a core communication network;

determining whether the call originates from behind a trunk, wherein the determining comprises determining whether a trunk group identifier is associated with the call, wherein the trunk group identifier is associated with a plurality of channels;

invoking an interactive voice response session with the caller if the call originates from behind the trunk, where the interactive voice response session is used for obtaining customer information from the caller; and using a caller identification for obtaining the customer information, if the call does not originate from behind the trunk, wherein the customer information is provided to a call center of the enterprise customer, wherein the customer information is for obtaining account information that is presented to a call center agent of the call center.

6. The non-transitory computer-readable medium of claim 5, wherein the communication network is an internet protocol network.

7. The non-transitory computer-readable medium of claim 5, wherein the interactive voice response session is implemented on a media server operated by the enterprise customer.

8. The non-transitory computer-readable medium of claim 5, wherein the interactive voice response session is implemented on a media server operated by a service provider of a core communication network.

9. An apparatus for providing calling party information in a communication network, comprising:

a processor, and a computer-readable medium storing a plurality of instructions which, when executed by the processor, cause the processor to perform operations comprising:

receiving a call from a caller via a toll free number, wherein the toll free number is associated with a toll free service subscribed by an enterprise customer of a core communication network;

determining whether the call originates from behind a trunk, wherein the determining comprises determining whether a trunk group identifier is associated with the call, wherein the trunk group identifier is associated with a plurality of channels;

invoking an interactive voice response session with the caller if the call originates from behind the trunk, where the interactive voice response session is used for obtaining customer information from the caller; and using a caller identification for obtaining the customer information, if the call does not originate from behind the trunk, wherein the customer information is provided to a call center of the enterprise customer, wherein the customer information is for obtaining account information that is presented to a call center agent of the call center.

10. The apparatus of claim 9, wherein the communication network is an internet protocol network.

* * * * *